United States Patent
Norris et al.

(10) Patent No.: US 9,878,355 B2
(45) Date of Patent: Jan. 30, 2018

(54) METHOD OF TREATING WASTE ITEMS

(75) Inventors: John Norris, Blackburn (GB); Peter Norris, Blackburn (GB); Alan Reid, Blackburn (GB); Mark Talbot, Blackburn (GB)

(73) Assignee: B&M Longworth (Edgeworth) Limited, Blackburn, Lancashire (GB)

( * ) Notice: Subject to any disclaimer, the term of this patent is extended or adjusted under 35 U.S.C. 154(b) by 742 days.

(21) Appl. No.: 13/984,670

(22) PCT Filed: Feb. 13, 2012

(86) PCT No.: PCT/GB2012/000143
§ 371 (c)(1),
(2), (4) Date: Aug. 9, 2013

(87) PCT Pub. No.: WO2012/107732
PCT Pub. Date: Aug. 16, 2012

(65) Prior Publication Data
US 2013/0313100 A1  Nov. 28, 2013

(30) Foreign Application Priority Data

Feb. 11, 2011 (GB) .................................. 1102465.0

(51) Int. Cl.
| | | |
|---|---|---|
| *B09B 3/00* | (2006.01) | |
| *B29K 307/04* | (2006.01) | |
| *B29B 17/02* | (2006.01) | |
| *B29B 17/04* | (2006.01) | |
| *B29L 31/00* | (2006.01) | |
| *B29K 67/00* | (2006.01) | |
| *B29K 105/06* | (2006.01) | |

(52) U.S. Cl.
CPC .............. *B09B 3/0091* (2013.01); *B09B 3/00* (2013.01); *B29B 17/02* (2013.01); *B29B 17/0412* (2013.01); *B29K 2067/003* (2013.01); *B29K 2105/06* (2013.01); *B29K 2307/04* (2013.01); *B29L 2031/7158* (2013.01); *Y02W 30/622* (2015.05); *Y02W 30/625* (2015.05)

(58) Field of Classification Search
CPC ....... B02C 19/18; B02C 23/00; B02C 18/186; B03B 1/06; B03B 9/06
USPC .................. 241/1, 24, 301, DIG. 38, 23, 65
See application file for complete search history.

(56) References Cited

U.S. PATENT DOCUMENTS

| | | | |
|---|---|---|---|
| 3,946,495 A | 3/1976 | Osdor | |
| 4,235,707 A * | 11/1980 | Burke, Jr. .................. | B01J 3/02 162/21 |
| 4,540,467 A * | 9/1985 | Grube ....................... | C05F 9/02 134/17 |
| 5,849,094 A | 12/1998 | Mignani | |
| 6,306,248 B1 * | 10/2001 | Eley .......................... | D21B 1/12 162/21 |
| 2005/0173824 A1 * | 8/2005 | Rafferty .................... | B27N 1/00 264/109 |
| 2006/0112616 A1 * | 6/2006 | Noll .......................... | F23G 5/20 44/589 |
| 2007/0051390 A1 * | 3/2007 | Norris ...................... | B01D 41/04 134/42 |
| 2009/0039184 A1 | 2/2009 | Vanderpool | |
| 2010/0065128 A1 | 3/2010 | Benson et al. | |
| 2010/0263814 A1 | 10/2010 | Dottori et al. | |
| 2011/0192791 A1 | 8/2011 | Yang | |

FOREIGN PATENT DOCUMENTS

| | | |
|---|---|---|
| CN | 85106006 A | 2/1987 |
| CN | 1669683 A | 9/2005 |
| CN | 101 468923 A | 7/2009 |
| CN | 102216435 A | 10/2011 |
| EP | 1 628 736 | 3/2006 |
| WO | WO 2004/105918 | 12/2004 |

OTHER PUBLICATIONS

English Translation of 2nd Chinese Office Action dated Nov. 5, 2015.
English Abstract of CN1669683 A, dated Sep. 21, 2005, printed from Espacenet on Jul. 28, 2017.
English Translation of CN102216435 A, dated Oct. 12, 2011, obtained from Patent Translate (Powered by EPO and Google) on Jul. 27, 2017.
English Translation of CN85106006 A, dated Feb. 28, 1987, obtained from Patent Translate (Powered by EPO and Google) on Jul. 27, 2017.
Examination Report for EP 12 708361.6, dated Mar. 22, 2016.

\* cited by examiner

*Primary Examiner* — James S McClellan
*Assistant Examiner* — Peter Iannuzzi
(74) *Attorney, Agent, or Firm* — Woodard, Emhardt, Moriarty, McNett & Henry, LLP

(57) ABSTRACT

Disclosed is a method of fragmenting a discrete waste product item or a combination of discrete waste product items involving introducing the discrete waste product item or combination of discrete waste product items into a pressure vessel, subjecting the item or items to an atmosphere of superheated steam in the vessel of at least 0.5 bar above atmospheric pressure, subsequently decompressing the vessel to achieve a pressure reduction of at least 0.5 bar in at most 5 seconds, and repeating the steps to effect fragmentation of the waste product item or combination of waste product items.

5 Claims, No Drawings

METHOD OF TREATING WASTE ITEMS

The present invention relates to a method of treating waste items, for example such items as present in general household and municipal waste as well as specific items that may have reached the end of their useful life. Examples of such items include those produced on a "use once" basis of a material that is ideally recycled (e.g. plastics bottles). The treatment method of the invention is one for effecting fragmentation of the waste, e.g. for the purposes either of reducing the waste to a smaller volume to facilitate disposal or rendering the waste into a form more amenable for recycling. Depending on the nature of the waste and the purpose of fragmentation, the method of the invention may be effected to convert the waste into a powdered material or to break the waste down (e.g. by delamination in the case of a laminated article) into parts which facilitate reclamation or recycling.

Many modern, disposable household items, by design, occupy relatively large amounts of space. They are moulded and formed into shapes such as bottles and boxes which whilst weighing little and using small amounts of material, are bulky.

This bulk is a particular problem at the end of the product's life when it comes to be disposed of. Transporting waste, landfill and even recycling items are all hampered if that waste is bulky. The very design of many modern items means they create air pockets and voids when compacted. Simply applying pressure may crush items into each other but cannot release these air pockets unless the item itself is broken down.

For many years, the accepted method for disposing of waste was to send it to landfill. However in recent years there has been a drive to reduce the volume of waste disposed of by this route. This is partly for environmental reasons in that landfill capacity around the world is a pressing issue and the creation of new sites is particularly contentious and partly because of the appreciation that at least certain types of waste articles may be recycled. For these reasons, it is generally necessary to effect some fragmentation of the waste articles, either to reduce the volume of material that is sent to landfill or to convert the waste article into a form which is more readily amenable to recycling.

U.S. Pat. No. 4,540,467 (Grube) discloses a method suitable for fragmenting both solid waste material from industrial production processes and various types of municipal waste material. With regard to treatment of waste material from industrial production processes, the method is particularly applicable to the removal of sand from metal components prepared by casting molten metal into sand moulds. The process is also stated to have particular utility to the treatment of waste material which comprises components which may be saturated with water, are closed containers, or are glass. The process uses a pressure vessel with an upper hatch which may be opened to allow the waste material to be treated to be introduced into the vessel and a lower hatch which may be opened to allow treated material to be discharged from the vessel. The process comprises loading the material to be treated into the pressure vessel and (in preferred embodiments) treating the waste with an aqueous liquid which incorporates one or more of a surface active agent, a bleaching compound, an acid or a base prior to (or simultaneously with) pressurisation of the vessel with steam. The particular treatment agent is selected depending on the type of waste material to be treated. Thus, for example, (i) surface active agents are used to ensure wetting of paper, wood, rags and other water absorbers, (ii) bleaching compounds are used for treatment of paper products for removal of inks and other colouring matter, (iii) acids are used for the treatment of paper products for the case where these are to be used in the manufacture of industrial alcohols (the acid converting the paper product to sugars), and (iv) bases are used to soften compacted sands for the case where an investment casting mould is to be cleared of waste sand.

The steam serves to heat and pressurise the contents of the vessel to a desired temperature and pressure and also add moisture to those contents that can be saturated with moisture. At the desired pressure, the lower hatch associated with the pressure vessel is opened so as rapidly to reduce the pressure within the vessel back to atmospheric and discharge the treated components. The rapid reduction in pressure is stated, in U.S. Pat. No. 4,540,467, to allow a sudden explosive decompression of the contents of the vessel which results in a rapid expulsion thereof from the vessel. During the decompression and expulsion, moisture and a certain proportion of other liquid contained in the waste material flashes to steam and vapour. This sudden flashing of the water to steam is said to rupture much of the waste material tiny fragments. The discharged waste can then be further processed as required.

The disclosure of U.S. Pat. No. 4,540,467 contemplates the preferred pressures (within the vessel) for use in the process as being from 1 to about 3 atmospheres (absolute) with about 15 lbs per sq. in. (1.1 kg/cm$^2$) above atmospheric pressure or about 2 atmospheres (absolute) being preferred, although it is contemplated that pressure vessels capable of operating at 300 pounds of pressure with corresponding saturated steam temperature of the order of 423° F. (ca 220° C.) might also be used, with higher autoclave pressures and temperatures prior to decompression yielding more thorough fragmentation.

Examples of moisture saturable materials that may be fragmented by the procedure of U.S. Pat. No. 4,540,467 include paper materials as well as certain construction materials, e.g. concrete, wallboard, timber and other porous materials capable of absorbing water. The procedure of U.S. Pat. No. 4,540,467 also results in the rupture of closed containers as well as the shattering of glass due to the explosive discharge from the vessel as well as the thermal gradient through which the glass cools from the elevated temperature. However the procedure of U.S. Pat. No. 4,540,467 does not result in the fragmentation of solid plastics articles which need to be screened out of the fragmented waste.

There are numerous disadvantages with the procedure described in U.S. Pat. No. 4,540,467. Firstly, the preferred procedure requires a treatment of the waste material with an appropriate chemical reagent (for which examples have been given above). Thus this step involves an additional "wet treatment" of the waste and there is the attendant cost of the chemicals involved. Secondly, our experience leading to the development of the present invention shows that the single cycle of pressurisation and explosive decompression may produce less than optimum fragmentation. Thirdly under the conditions proposed in U.S. Pat. No. 4,540,467 plastics articles remain intact and are not fragmented (see above).

EP-A-1 628 736 (Longworth Engineering) discloses a process for cleaning filter components, particularly such components that have been used for the filtration of molten polymer and which have a deposited residue of solidified polymer that impairs performance of the component. In the method described in EP-A-1 628 736, the filter component to be cleaned is located in a pressure vessel provided with an outlet valve that may be rapidly opened and subsequently closed. The filter component to be cleaned is located in the pressure vessel which is repeatedly subjected to a cycle of pressurisation with superheated steam and rapid decompression which is effected by opening of the (rapidly openable) valve associated with the pressure vessel. In more detail, the superheated steam raises the pressure in the vessel by at least 0.5 bar (and more preferably by 2 to 15 bar) and the vessel is decompressed such that there is a pressure loss of at least 0.5 bar in at most 5 seconds and ideally at most 1 second. The rapid decompression is described in EP-A-1 628 736 as "flash decompression". It is proposed in EP-A-1 628 736 that the flash decompression results in instantaneous boiling of water in the interface between the residues and the filter components (and possibly also within the residues themselves) resulting in the residues being shattered and stripped from the filter component which itself maintains its integrity and its cleaned for subsequent use. Typically 2 (more usually at least 5) to 100 (or more) cycles of pressurisation with superheated steam and rapid ("flash") decompression are required to clean a filter component contaminated with solidified polymer residues.

According to the present invention there is provided a method of fragmenting a discrete waste product item or a combination of discrete waste product items, the method comprising the steps of:

(a) introducing said discrete waste product item or combination of discrete waste product items into a pressure vessel, (b) subjecting said item or items to an atmosphere of superheated steam in the vessel of at least 0.5 bar above atmospheric pressure, (c) subsequently decompressing the vessel to achieve a pressure reduction of at least 0.5 bar in at most 5 seconds, and (d) repeating steps (b) and (c) to effect fragmentation of said waste product item or combination of waste product items.

By the expression "discrete waste product item" we mean that the item is individual in its own right and may be introduced unconstrained into the pressure vessel for fragmentation of the item in accordance with the method of the invention defined above. The term "discrete waste product item" as used herein is therefore to be distinguished from a deposit clogging the parts of a filter (cf discussion of EP 1 628 736 above) since such deposits are not, and cannot, be regarded as "unconstrained" in that they are physically associated with the filter.

For the purposes of the following description it should be understood that to the extent that the method of the invention is applied to a collection of discrete waste product items then items of the collection may be different from each other, such as would be the case in the treatment of household/municipal waste. Furthermore, such a collection may, in addition to articles that will be fragmented by the method other items may not (e.g. metal items—see below).

We have found that subjecting discrete waste product items to repeated cycles of steps (b) and (c) as defined above provides significant advantages in the treatment of such items (for effecting fragmentation thereof) as compared to the process disclosed in U.S. Pat. No. 4,540,467. In particular, the method of the invention may be effected without the need for any pre-soak or pre-treatment with chemical reagents of the waste product items to be treated and still achieve fragmentation. Moreover, the conditions employed in the present invention (with its repeated cycles of steps (b) and (c)) allow more effective fragmentation and also control of the degree of fragmentation obtained. Consider a particular type of waste product that may be fragmented in accordance with the disclosure of U.S. Pat. No. 4,540,467. The method of the present invention using a particular degree of pressurisation for step (b) and particular conditions for effecting decompression step (c) will, with repeated cycles of these steps, produce a greater degree of fragmentation for that waste product than the single stage process of the US patent using the same pressurisation and decompression conditions. Furthermore, by selecting the number of repeats of steps (b) and (c) effected on a particular waste product using the method of the invention it is possible to fragment the waste product to a greater or lesser degree as may be desired. Thirdly, the process of the present invention allows fragmentation of waste products that remain untouched by the procedure of the US patent, a particular example being plastics components (e.g. PET) bottles) that can be rendered into the form of a powder using the method of the invention.

We do not wish to be bound by theory, but our understanding is that the mechanism by which the discrete waste product items are fragmented by the steam and flash decompression may be one or more of melting, hydrolysis and thermal decomposition (although the exact mechanism will depend on the nature of the waste product item being fragmented).

The method of the invention may be effected for a sufficient number of cycles so as to convert the original waste product to a powder, if that is what is desired. The invention may be used to treat articles that are of recyclable materials, in which the fragmented (e.g. powder) form resulting from the treatment process can be supplied as a raw material for the production of further articles from that material. If the article that has been treated is not of a recyclable material (or recycling is not required) then the fragmented material may be disposed of in conventional ways but with the advantage provided by the invention that the volume of the material to be disposed of is much reduced as compared to the original article. It is not however a requirement of the invention that the method thereof lead to the production of a powder. For certain products (e.g. laminated articles as described more fully below) the requirement may be that the initially, intractable waste product is broken-down into parts which are more readily amenable to processing. Thus in the case of a laminated article in which individual layers are bonded together, the requirement may be separation of the layers which may then be further processed as required.

It should be appreciated that the invention differs in a number of ways from the disclosures in the aforementioned prior specifications, i.e. U.S. Pat. No. 4,540,467 and EP-A-1 628 736. With regard to U.S. Pat. No. 4,540,467, this only contemplates a single pressurisation and decompression step. In fact, the particular apparatus disclosed in U.S. Pat. No. 4,540,467 for effecting the method described therein is particularly adapted to a single pressurisation and depressurisation step. In more detail, such apparatus has a pressure vessel with upper and lower hatches. Waste to be treated is charged into the vessel through the upper hatch and at the completion of the pressurisation step the lower hatch is opened to discharge the waste. Furthermore under the treatment conditions disclosed in U.S. Pat. No. 4,540,467 plastics articles remain intact (see above) and are not fragmented whereas these may be successfully treated by the method of the invention (see below). Additionally, the method of the present invention does not require pre-treatment of the waste item(s) to be fragmented with any treatment agents, such as surface active agents, bleaching compounds, acid or bases such as generally required for the method of the US patent.

In relation to EP-A-1 628 736, this prior specification does not contemplate a method of fragmenting discrete waste product items. Rather, the prior specification is concerned with cleaning an article (i.e. the filter component) which itself remains intact at the end of the treatment process and it is only the constrained, contaminating polymer deposits that are removed. Looked at another way, the method of the invention fragments, what can be considered to be, a shape defining body of the item being treated. Thus the body of the item is fragmented (in other words destroyed by disintegration). This is complete in contrast, in the method of EP-A-1 628 736 the body of the article (i.e. the filter component) remains intact and the process is a cleaning operation to clean that component of contaminants.

The invention may be applied to the treatment of a wide range of waste product items.

Thus, for example, the method may be applied to the treatment of household or municipal waste which will comprise of many discrete waste product items that may be fragmented by the method of the invention, although generally metal articles will be left intact but can easily be screened-out of the powdered residue by conventional techniques. Examples of waste product items in household/municipal waste that may be fragmented by the method of the invention include food waste, paper, plastics, wood and glass. The food waste that may be fragmented by the method of the invention includes cooked and raw products of animal or vegetable origin, e.g. meat, poultry, fish, fruit, vegetables etc. The fragmented residue does not require any further break-down before the final disposal e.g. to landfill. This is to be compared with the preferred embodiment of U.S. Pat. No. 4,540,467 which the fragmented residue of municipal waste (obtained from the "explosive decompression" step) is discharged into a pit and sprayed with bacteria for composting to produce a final breakdown of the residues. Although this embodiment of the invention does still contemplate landfill of the fragmented residue, the volume of the residue is very much reduced as compared to the original waste and as indicated is in a sterile condition which renders it ideal for landfill disposal, given that is the chosen route.

The invention has particular application to the treatment of plastics articles so as to convert such articles into fragments which, as indicated, might be recycled or at the very least have significant reduction in volume as compared to the original article so as to be less of a problem for disposal purposes. Such plastics articles may be ones comprised of:
(a) a condensation polymer, such as a polyester (e.g. polyethylene terephthalate (PET)), polyamide, polycarbonate or cellulose acetate;
(b) an olefin polymer or co-polymer, for example polyethylene, polypropylene or PTFE; or
(c) polyurethane, PVA, PVC, polystyrene, PEEK, rubber or silicone.

By way of example, the method of the invention may be used to treat plastics bottles (particularly PET bottles) so as to convert the plastics material into fragments for recycling. It will appreciated that empty plastics bottles occupy a significant volume but by conversion to fragments by the method of the invention the volume occupied by the fragmented material is significantly less than that occupied by the bottles themselves.

A further particular example of plastics article that may be fragmented in accordance with the method of the invention are plastics filters which may have been used for gas (e.g. air) or liquid purification. Such filters may have trapped materials which it is desired to recover. A particular example that may be mentioned are isotopes, whether or not they are radioactive. By subjecting such filters to the method of the invention, there is produced fragments which, due to their high surface area, is amenable for processing to recover the component.

A further use of the present invention (to which brief reference has been made above) is its application to laminated articles, specifically composites which have reached the end of their useful life so as to recover individual layers of material.

Composites such as carbon fibre are often constructed from many strands of material, bonded into layers by resins or adhesives. This bonding creates exceptionally strong and resistant materials but the strands are consequently difficult to recover at end of the life of an article produced from the material. Conventional methods of recovery involve heating the article in an oven to effect delamination but without the use of an inert atmosphere, there is the possibility of burning/oxidisation and chemical breakdown of fibres due to the presence of oxygen. The method of the invention allows these articles to be effectively delaminated and therefore recovery of individual strands of material, without burning or otherwise degrading that material.

Our trials with carbon fibre have recovered high quality fibres of good length and with commercial value. In comparison, other methods of fibre reclamation result in pitted, burnt and very short length fibres which have little commercial value due to the fact that they are unfit for many sensitive applications.

By effectively removing the resins that bond layers of composite together, we are able to recover fibres. The mild process conditions and the absence of oxygen (achieved by maintaining a supply of superheated steam to the vessel during the flash decompression step) mean that those fibres are of high quality and of similar quality and strength to pristine fibres.

The invention is also applicable to a treatment of a wide range of materials additional to those discussed above. Examples include food waste, wood, building materials (e.g. hardcore, cementitous materials, brick materials), wood, glass, paper, card and textile materials. Generally however metals are not fragmented by the method of the invention.

A further example of article that may be treated is a mattress, for example from a household or from an institution such as a Hospital or Care Home. The disposal of mattresses poses a particular problem since they are large, bulky items and (in some instances) may have been soiled. With the method of the invention, a mattress may be treated so that the textile components thereof (i.e. the cover and filling) are completely fragmented to leave a sterile residue, albeit that the metal springs of the mattress do remain. The metal may be recycled using conventional procedures (e.g. smelting) and the fragmented textile residue may be used as insulation or as a filler (e.g. for cushions).

The invention may be effected in a number of ways. Thus, for example, a plurality of articles of the same material may be simultaneously subjected to the pressurisation (with saturated steam) and rapid decompression steps in the pressure vessel. Thus, purely by way of example, a plurality of plastics bottles of the same material may be simultaneously treated. Obviously by treating articles of the same material it is ensured that the resulting, fragmented (e.g. powdered) product is a "single" material, as may be desired for recycling purposes. In other embodiments of the invention, the treatment method may be applied to a mixture of waste articles (e.g. as found in household refuse) in which case a mixed, fragmented product may be produced and certain articles (e.g. any metallic articles) will remain substantially unaffected and can be screened out of the fragmented product. In other instances, the method of the invention may be applied to a single article, particularly for the case where the article is relatively large and the pressure vessel can only accommodate once such article. A particular example of this instance is a mattress.

In the following description, the rapid pressure reduction step employed in the invention (i.e. a reduction of least 0.5 bar in at most 5 seconds) is referred to as "flash decompression".

Generally the method of the invention will involve subjecting the waste product item(s) to be treated to an atmosphere of 1 to 15 bar above atmospheric pressure (or even higher) of superheated steam. Generally however pressures of 4 to 6 bar above atmospheric pressure will be suitable. The pressure may be raised to the desired value over any suitable period, e.g. 1 to 10 hours, and flash decompression effected as soon as the desired value is reached. Alternatively the waste item(s) may be subjected to superheated steam at a particular pressure for a certain length of time prior to flash decompression being effected.

The pressure reduction achieved during flash decompression (in less than five seconds) may be at least 1 bar, for example at least two bar although it will be appreciate that the maximum pressure reduction that may be achieved is dependent on the initial pressure increase above atmospheric pressure. As indicated, the flash decompression is effected in a maximum of five seconds. More preferably, the flash decompression is achieved in at most four seconds, more preferably at most three seconds, even more preferably at most two seconds and most preferably in a time period of one second or less. Generally the time for flash decompression will be a minimum of one millisecond. Thus, for example, a period of one millisecond to five seconds may be appropriate.

For the purposes of effecting flash decompression, the vessel in which the filter element is treated will be provided with a suitable valve (the "flash decompression valve") which may be rapidly opened to allow release (from the vessel) of the superheated steam to effect flash decompression. The flash decompression valve may for example be a butterfly valve or similar rapid opening low flow restriction valve.

The superheated steam supplied to the vessel will generally be at a temperature of at least 150° C., more preferably at least 200° C., more preferably at least 300° C. and most preferably at least 400° C. Generally the superheated steam as supplied to the vessel will have maximum of 500° C. It is particularly preferred that the superheated steam supplied to the vessel has a temperature of 400° C. to 500° C. Although the superheated steam is supplied to the vessel at a particular temperature, it will be appreciated that there will be some cooling of the steam within the vessel so the temperature at which "flash decompression" occurs will, at least initially, be somewhat less than the temperature of the superheated steam as supplied. However with repeated cycles of pressurisation (with superheated steam) and flash decompression, the temperature within the vessel at the time of flash decompression will increase.

The method of the invention involves repeated steps of subjecting the waste product item(s) to superheated steam at a pressure of at least 0.5 bar above atmospheric and then effecting flash decompression. The number of repeat steps required to achieve a desired degree of fragmentation will depend on a number of factors, in particular the nature of the waste product item(s) being treated, the temperature in the vessel (which in turn is dependent on the temperature of the superheated steam supplied to the vessel) the extent to which the vessel is pressurised, and the rapidity of flash decompression. The skilled person is readily able to conduct simple experiments to determine how many repeat steps are required. However purely by way of example waste plastics items may be treated using superheated steam supplied at a temperature of 350° C. and effecting 90 cycles of pressurisation to 5 bar (gauge) and decompression to atmospheric pressure within less than 5 seconds at 2 minute intervals for maximum fragmentation and volume reduction.

In an advantageous embodiment of the invention, the supply of superheated steam to the vessel is maintained during the flash decompression step, particularly for the case where a substantially oxygen free atmosphere is desired to be maintained in the vessel.

In a refinement of the invention, the vessel is initially supplied with dry saturated clean steam which will be at a temperature of 100-150° C. to serve to heat the article(s) to be treated somewhat before the introduction of the superheated steam. Dry saturated steam is steam that has absorbed the maximum amount of enthalpy of evaporation and is 100% dry, i.e. no free moisture.

An apparatus for effecting the process of the invention may comprise, in addition to the flash decompression valve, an outlet flow control valve which may be adjusted to provide a desired steam flow through the vessel. The outlet valve may, for example, be a needle valve.

Taking into account the above points, a preferred process in accordance with the invention comprises the followings steps (subsequent to the introduction of the article(s) to be treated into the pressure vessel):

(a) initial introduction of dry saturated clean steam, (the desired temperature being achieved by controlling the steam outlet flow by means of a fine control valve).
(b) introduce dry superheated clean steam at e.g. 400° C. into the vessel and maintain the outlet flow control valve open. This step is effected so that the temperature in the vessel is brought to a desired level.
(c) close the outlet flow control valve to allow the pressure in the vessel to increase to a predetermined value, e.g. 3 bar.
(d) effect flash decompression as soon as (or shortly after) the desired pressure in the vessel (e.g. 3 bar) has been achieved by opening of the flash decompression valve.
(e) close the flash decompression valve.
(f) effect at least one further cycle of steps (d)-(e).
(g) open the outlet flow control valve and subject the article(s) to a further period of treatment with the superheated steam.
(h) repeat steps (c)-(g) as often as required.
(i) close the outlet flow control valve to allow the pressure in the vessel to increase to a predetermined value, e.g. 3 bar.
(j) effect final flash decompression and allow vessel to cool.

The flash decompression may be effected by opening the flash decompression valve and venting the superheated steam directly to atmosphere. It will however generally be more preferred to transfer the steam from the vessel in which the filter component is treated into a so-called 'blowdown' vessel from which the steam is either discharged to atmosphere or passed to a fume treatment step.

The method of the invention may be effected using an apparatus generally as illustrated in, and described with reference to, FIGS. 1 and 2 of EP-A-1 628 736 with appropriate modification.

The invention will be further illustrated by the following non-limiting examples which were designed to show the reductions in volume of waste materials that can be achieved using the method of the invention.

In all of the examples, the waste to be treated was placed in a mesh basket. It will be noted that in three of these Examples, the volume of material prior to the process is the same in each case. This is due to the material being compacted as far as possible in these circumstances (clearly still containing air pockets and voids) and being approximately equal to the volume of the process basket.

EXAMPLE 1

Mixed Plastics

A sample of mixed plastics comprised of various food packaging and other general household plastics items was compiled. The sample comprised soft drinks bottles (PET), ready meal trays and film lids (PET), hardened tool trays (of the kind used to store nuts and bolts), bottles and lids from cosmetics, 8 ft of insulation from copper wire, and a section of standard drainpipe (PVC).

The sample weighed 1489 grams and for the purpose of effecting the method of the invention was compacted by hand into a perforated basket so as to occupy approximately the whole volume of the basket (6185 cubic cm).

The sample was treated in accordance with the method of the invention for a total period of 60 minutes using the following conditions:
 (i) steam generated at 400 degrees C. and 5 bar.
 (ii) vessel pressure immediately prior to decompression—4.5 bar (gauge)
 (iii) pressure reduction achieved by decompression—3.5 bar.
 (iv) time for flash decompression—3 seconds.
 (v) 80 cycles at 45 seconds/cycle.

At the end of the process, it was found that the weight of the sample had reduced to 1195 grams and its volume to 3433 cubic cm.

There was evidence in the process vessel of some melting where it could be seen that material had fallen out of the steam flow into dead areas. Most of the sample had clearly broken down and compacted into the basket.

The residue was a free-flowing, brittle product without structural integrity. It was found that the original sample (comprised of whole items) was fragmented into one mixed and compacted product. The colour was not uniform but there were traces of each original colour "marbled" through the fragmented and free-flowing product.

EXAMPLE 2

Food Waste

A sample of mixed foodstuffs and some typical packaging was created. The foodstuffs comprised both cooked and raw meat and vegetables and processed items such as biscuits, chocolate and "ready meals". The packaging comprise "ready meal" trays c/w film lids, glossy cardboard sleeves and drink cartons.

The sample was shredded and compacted by hand into a perforated basket which, with the sample, weighed a total of 3105 g. The compacted volume of the sample was approximately 6185 cubic cm.

The samples was subjected to repeated steps of pressurisation with superheated steam and "flash decompression" using the same conditions as detailed in Example 1 for a total of 60 minutes.

The maximum temperature reached during the process was 380° C. and the average pressure reached prior to 4.2 bar.

At conclusion the sample was found to weigh 1700 grams and occupied a volume of approximately 2470 cubic cm. With the exception of the steel pot (which was unaffected) the residual material was thoroughly disintegrated, mainly to non-uniform powder.

There was no detectable odour from the sample after process.

EXAMPLE 3

Hardcore and Processed Wood.

A sample of brick, concrete and processed wood was created. The brick and concrete material was broken into small pieces to allow loading into a perforated basket. The wood material was pieces of typical pallet planks and broken broom handle.

The sample was compacted as far as possible into a perforated basket. The combined weight of the basket and sample was 4229 grams. The sample occupied approximately 3772 cubic cm, although owing to the structure of the materials under process there was some interstitial space inside the basket.

The samples was subjected to repeated steps of pressurisation with superheated steam and "flash decompression" using the same conditions as detailed in Example 1 for a total of 60 minutes.

The maximum temperature reached during the process was 390° C.

At conclusion, the sample was found to be only slightly changed. The brick material was unchanged, the concrete material had been somewhat corroded but not to any great degree. The wood material had fractured into smaller pieces but was largely unchanged. The weight of the sample after process was found to be 4204 grams and the volume occupied by the sample was unchanged.

EXAMPLE 4

Paper & Card.

A sample of mixed papers and card was created. It consisted of whole newspaper, standard printer paper, glossy paper and small pieces of card.

The sample was compacted by hand into the perforated basket. The weight of the sample was 1940 grams. The compacted sample occupied a volume of approximately 6185 cubic cm.

The samples was subjected to repeated steps of pressurisation with superheated steam and "flash decompression" using the same conditions as detailed in Example 1 for a total of 60 minutes.

The maximum temperature reached during the process was 405° C.

At the conclusion of the process the sample was completely degraded. The paper and card was fragmented into small flakes and was compacted into the bottom of the perforated basket. The combined weight of the basket and sample was 1735 grams. The sample occupied a volume of approximately 3127 cubic cm.

The following Table summarises the results of Examples 1 to 4.

|  | Weight before | Weight After | Reduction % | Volume before | Volume after | Reduction % |
|---|---|---|---|---|---|---|
| Mixed plastics | 1489 | 1195 | 19.75 | 6185 | 3433 | 56 |
| Food Waste | 1825 | 1700 | 2.85 | 6185 | 2470 | 40 |
| Hardcore & Wood | 4229 | 4204 | 0.60 | 3772 | 3772 | 0 |
| Paper & Card | 1940 | 1735 | 11.57 | 6185 | 3127 | 51 |
|  | Average |  | 8.69% | Average |  | 36.75% |

As can be seen from the average figures at the bottom of the table, potentially large reductions in volume can be achieved in the volume of waste. If the figures for hardcore and wood and discounted (separated from general waste) the figure rises to 49% average reduction in volume.

The process is therefore shown to be capable of almost halving the volume of some wastes.

The reduction in weight is thought to be attributable to gaseous product escaping from the vessel, minor residues on the interior surfaces of the vessel that cannot be collected and also some experimental error.

EXAMPLE 5

Carbon Fibre Laminate

Remnant pieces of carbon fibre laminate from the aerospace industry weighing a total of 194 grams were loaded into a stainless steel basket which was then transferred into a small pressure vessel.

The sample was treated in accordance with the method of the invention using the following conditions:
(i) superheated steam generated at 550° C.
(ii) time to pressurise vessel—15 seconds.
(iii) vessel pressure immediately prior to decompression—5 bar gauge.
(iv) outlet valve open for a total of 5 seconds during which flash decompression occurs.
(v) pressure reduction achieved by flash decompression—4 bar.

The method involved repeated cycles of steps (ii)-(v) for a total period of 3 hours, subsequent to which the vessel was allowed to cool. Steam flow to the vessel was maintained throughout the entire 3 hours, even during the decompression step.

At the end of the method, 75 grams of carbon fibres were recovered so that approximately 119 grams of resin had been removed in the steam flow during decompression (although it is possible that some of the smaller, loose fibres had also been lost in the exit steam flow).

The remaining loose fibre residue had tensile properties similar to those displayed by pristine carbon fibres.

The invention claimed is:

1. A method of recovering carbon fibers by delamination of a waste carbon fiber composite article comprised of carbon fibers bonded into layers by resin or adhesive or a combination of such articles, the method comprising the steps of:
   (a) introducing said article or combination of articles into a pressure vessel,
   (b) supplying to said vessel superheated steam at a temperature of at least 400° C. and pressurizing said vessel to subject said article or articles to an atmosphere of superheated steam in the vessel of at least 0.5 bar above atmospheric pressure,
   (c) subsequently decompressing the vessel to achieve a pressure reduction of at least 0.5 bar in at most 5 seconds while maintaining the supply of superheated steam to the vessel, and
   (d) repeating steps (b) and (c) to effect delamination of said article or combination of articles to recover carbon fibers therefrom.

2. A method as claimed in claim 1 wherein the pressure reduction is of at least 1 bar.

3. A method as claimed in claim 1 wherein the pressure reduction is achieved in at most 4 seconds.

4. A method as claimed in claim 3 wherein the pressure reduction is achieved in at most 1 second.

5. A method as claimed in claim 1 wherein the article or articles is/are subjected to an atmosphere of 2 to 15 bar above atmospheric pressure of superheated steam.

* * * * *